United States Patent Office 3,463,857
Patented Aug. 26, 1969

3,463,857
ANTICONVULSANT COMPOSITIONS AND METHOD EMPLOYING NAPHTHALENE-DICARBOXIMIDE COMPOUNDS
Eugene R. Wagner, Zionsville, Ind., and Allen D. Rudzik, Kalamazoo, Mich., assignors to The Dow Chemical Company, Midland, Mich., a corporation of Delaware
No Drawing. Filed May 15, 1967, Ser. No. 638,619
Int. Cl. A61k 25/00
U.S. Cl. 424—274        10 Claims

ABSTRACT OF THE DISCLOSURE

Method for combating convulsions in animals comprising administering to the animal a substituted 4a,8a-naphthalenedicarboximide or 1,4,5,8-tetrahydro - 4a,8a-naphthalenedicarboximide, and the resulting compositions.

---

This invention relates to a method and compositions for controlling convulsions or convulsive states in animals employing a substituted 4a,8a-naphthalenedicarboximide compound as the active anticonvulsant agent.

It is an object of the invention to provide a process for combating convulsions in animals by administration of novel compositions containing a 4a-8a-naphthalenedicarboximide compound as the active ingredient therein. It is another object of the invention to provide anticonvulsant pharmaceutical compositions having little or no significant activity in other areas at dosages consistent with good anticonvulsant effects and which have low toxicity. Other objects and advantages will become apparent on consideration of the following description and claims.

According to the invention, it has been discovered that convulsive states in animals can be controlled by the administration to the animal of an anticonvulsant amount of a 4a,8a-naphthalenedicarboximide compound corresponding to one of the formulae:

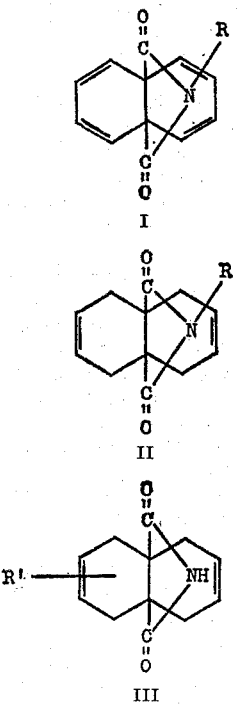

In the present specification and claims, R represents hydrogen or a lower alkyl group containing from 1, to 2, to 3 carbon atoms and R′ represents a lower alkyl group containing from 1, to 2, to 3 carbon atoms. For the sake of convenience, the compounds corresponding to the above formulae will be referred to as "naphthalenedicarboximide compounds." Said compounds are preferably administered in the form of pharmaceutical compositions as hereinafter set forth. The preferred active ingredients in the compositions and method of the invention are the known compound, 1,4,5,8-tetrahydro-4a,8a-naphthalenedicarboximide, and the novel compound, 4a,8a-naphthalenedicarboximide.

In the method of the invention, convulsions in animals and in mammals in particular are controlled by administering to the animal an anticonvulsant dose of one of the naphthalenedicarboximide compounds. The anticonvulsant dose is a dosage sufficient to substantially block convulsions while being less than a toxic dose. The naphthalenedicarboximide compounds can be administered to the animal in various ways as, for example, orally or by injection, provided an anticonvulsant and less-than-toxic dose is introduced into the internal tissues of the animal. The exact amount of the naphthalenedicarboximide compounds to be administered depends on a variety of factors such as the type, size and age of the animal to be treated, the particular naphthalenedicarboximide compounds employed, the particular type of convulsion or convulsive state to be controlled, the method of administration, the frequency of administration and the duration of treatment, for example. Generally, good control of convulsions is obtained when dosages from about 10 to about 95 milligrams per kilogram are administered by intraperitoneal injection, the preferred dosage being from about 10 to about 50 milligrams per kilogram of animal body weight.

In preparing the compositions of the invention, at least one of the naphthalenedicarboximide compounds is incorporated into a pharmaceutical carrier. The term "pharmaceutical carrier," as employed in the present specification and claims, refers to known pharmaceutical excipients which are substantially non-toxic and non-sensitizing and which are compatible with the naphthalenedicarboximide compounds. The compositions for oral administration comprising naphthalenedicarboximide compounds and a pharmaceutical carrier can be in the form of tablets, capsules, aqueous or oily suspensions, dispersible powders or granules, emulsions or syrups or elixirs. The compositions for injection can be in the form of sterile injectable suspensions such as aqueous suspensions containing known suitable wetting agents and suspending agents. The compositions are preferably prepared in the form of dosage units containing from about 100 to about 300 milligrams of the active ingredient per unit.

Compositions intended for oral use may be prepared in the form of tablets containing the naphthalenedicarboximide compound in admixture with non-toxic pharmaceutical excipients known to be suitable in the manufacture of tablets. Suitable pharmaceutical carriers can be, for example, inert diluents such as calcium carbonate, sodium carbonate, lactose, calcium phosphate or sodium phosphate, granulating and disintegrating agents such as corn starch or alginic acid, binding agents such as starch, gelatin or gum acacia, and lubricating agents such as magnesium stearate, stearic acid or talc. The tablets can be uncoated or they can be coated by known techniques to delay disintegration or absorption in the gastrointestinal tract and thereby provide sustained action over a prolonged period. Tablets for maintaining prolonged effects can contain the active ingredient embedded in a waxy core around which is compressed a granulated mixture of the active ingredient together with a pharmaceutical carrier.

The said tablet compositions can be formulated so that for every 100 parts by weight of the composition there are present between about 25 and 95 parts by weight of the active ingredient, and preferably between about 30 and about 90 parts by weight of the active naphthalenedicarboximide compound. The tablet compositions will generally contain between about 100 and about 300 milligrams of the active ingredient per tablet.

Aqueous suspensions can contain the naphthalenedicarboximide compounds in admixture with pharmaceutical carriers known to be suitable in the manufacture of aqueous suspensions. Suitable pharmaceutical carriers can be, for example, suspending agents such as methyl cellulose, hydroxypropylmethyl cellulose, sodium alginate, gum tragacanth or gum acacia. Dispersing or wetting agents can include lecithin, polyoxyethylene stearate, condensation products of ethylene oxide with esters derived from fatty acids and hexitol anhydrides such as polyoxyethylene sorbitan monooleate or other like agents. The aqueous suspensions can also contain preservatives, coloring agents, flavoring agents and sweetening agents such as sucrose saccharin or sodium cyclamate.

Oily suspensions can be formulated by suspending the naphthalenedicarboximide compound in a vegetable oil such as olive oil, peanut oil or cocoanut oil or in a mineral oil, and the said oily suspension can contain a thickening agent such as beeswax or cetyl alcohol. The said preparations can also include preservatives, coloring agents, flavoring agents or sweetening agents.

Dispersible powders and granules suitable for preparation of an aqueous suspension by the addition of water contain the naphthalenedicarboximide in admixture with a dispersing or wetting agent, suspending agent and other excipients such as preservatives, sweetening, flavoring and coloring agents.

The compositions of the invention can also be in the form of emulsions. Such emulsions can include such pharmaceutical carriers as olive oil, arachis oils, emulsifying agents such as gum acacia, gum tragacanth, lecithin, sorbitan monooleate and sweetening, flavoring and coloring agents.

Further formulations for oral use can also be prepared as hard or soft gelatin capsules wherein the naphthalenedicarboximide is mixed with an inert solid diluent such as calcium carbonate, calcium phosphate or kaolin or an inert oily medium such as olive oil or liquid paraffin. Capsules for maintaining prolonged effects can contain, for example, micropills which contain small particles of the naphthalenedicarboximide compound covered with coats having different rates of degradation. The capsule compositions will generally contain between about 100 and about 300 milligrams of the naphthalenedicarboximide compound.

The active ingredient in the compositions of the invention can be the known compound, 1,4,5,8-tetrahydro-4a, 8a-naphthalenedicarboximide, corresponding to Formula II wherein R is hydrogen and which is prepared by the method of Snatzke et al., Ann., 684, 62 (1965). The compounds corresponding to Formula II wherein R is lower alkyl can be prepared by the reaction of 1,4,5,8-tetrahydro-4a,8a-naphthalenedicarboxylic anhydride with an excess alkylamine such as methylamine, ethylamine or propylamine.

The active ingredient in the pharmaceutical compositions can also be a novel naphthalenedicarboximide compound, and the novel compounds form an additional feature of the invention. The preferred new compound, 4a,8a-naphthalenedicarboximide, is prepared by the bromination of 1,4,5,8-tetrahydro-4a,8a-naphthalenedicarboximide with N-bromosuccinimide followed by dehydrobromination of the brominated intermediate with quinoline. The 4a,8a-naphthalenedicarboximide product is separated and purified by conventional methods such as chromatography. The N-substituted-4a,8a-naphthalenedicarboximides can be similarly prepared from the compounds corresponding to Formula II when R is lower alkyl by bromination followed by dehydrobromination. The novel N-alkyl-naphthalenedicarboximide compounds corresponding to Formula I can also be prepared by the reaction of 4a,8a-naphthalenedicarboximide with a diazoalkane such as diazomethane or diazoethane as hereinafter described.

The naphthalenedicarboximide compounds corresponding to Formula III are prepared by the reaction of 3,6-dihydrophthalic anhydride with a subsituted 1,3-butadiene corresponding to the formula

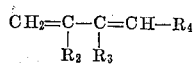

IV wherein $R_2$, $R_3$ and $R_4$ each represent hydrogen or a lower alkyl group containing from 1, to 2, to 3 carbon atoms, with the proviso that when one of $R_2$, $R_3$ and $R_4$ represents lower alkyl, the remaining two represent hydrogen. This reaction produces a 1,4,5,8-tetrahydro-4a,8a - naphthalenedicarboxylic anhydride intermediate which is then mixed with aqueous ammonia to prepare the corresponding substituted 1,4,5,8 - tetrahydro - 4a,8a-naphthalenedicarboximide as hereinafter described.

The following examples illustrate the invention but are not to be construed as limiting the same.

Example 1

1,4,5,8 - tetrahydro - 4a,8a - naphthalenedicarboximide (10 grams), N-bromosuccinimide (17.8 grams) and 600 milliliters of carbon tetrachloride were mixed together and the mixture was heated at the boiling point under reflux for one-half hour. The reaction mixture was cooled and filtered and the filtrate was evaporated in vacuo. The residue was mixed with 30 milliliters of quinoline and the mixture was heated to a temperature of 140° C. for about 15 minutes. The mixture was then poured into about one liter of water and aqueous 10 percent sulfuric acid was added until a precipitate formed. The mixture was then filtered and the precipitate was collected as a filter cake. The filter cake was dissolved in 300 milliliters of chloroform, the solution was washed once with aqueous 10 percent sulfuric acid and twice with water and the washings were discarded. The washed solution was dried over anhydrous sodium sulfate and evaporated in vacuo. The evaporation residue was chromatographed on a column containing 75 grams of silicic acid (Mallinckrodt Chromatography Grade) using chloroform as an elution solvent. The material separated into visible bands on the column and when the first visible band began to move off the column, 200 milliliter fractions were collected. The second such fraction was evaporated in vacuo. The residue was dissolved in methylene chloride, activated carbon was added and the mixture was filtered. The mixture was twice dissolved in ethanol, treated with activated carbon and filtered. The filtrate was evaporated in vacuo and the residue was dissolved in a mixture of ethylene chloride and carbon tetrachloride. The solution was boiled until an amorphous solid material precipitated and the solid material was removed by filtration. The filtrate was concentrated in vacuo and refrigerated over night, during which time a crystalline material precipitated. The crystals were separated by filtration, washed with carbon tetrachloride and the 4a,8a-naphthalenedicarboximide product was found to melt at 156°–161° C. The structure of the product was confirmed by infrared spectroscopy. The product was dissolved in methanol and treated with activated carbon and recrystallized twice from carbon tetrachloride. The purified 4a,8a-naphthalenedicarboximide product was found to melt at 164°–165° C. and was found to have carbon, hydrogen and nitrogen contents of 72.27, 4.63 and 7.27 percent, respectively, as compared with the contents of 72.35, 4.55 and 7.04 percent, respectively, calculated for the named structure.

Example 2

Ten grams of 1,4,5,8-tetrahydro-4a,8a-naphthalenedicarboxylic anhydride and 500 milliliters of aqueous 40 percent methylamine were mixed together and heated to the boiling point under reflux for about four hours, during which time a precipitate formed. The mixture was filtered and the filter cake was washed with water and recrystallized twice from ethanol. The N-methyl-1,4,5,8-tetrahydro-4a,8a-naphthalenedicarboximide product was found to melt at 161°–162° C. and was found by analysis to have carbon, hydrogen and nitrogen contents of 72.11, 7.04 and 6.45 percent, respectively, as compared with the contents of 71.87, 6.96 and 6.45 percent, respectively, calculated for the named structure. The structure of the product was confirmed by infrared spectroscopy and nuclear magnetic resonance analysis.

Example 3

In substantially the same procedure set out above in Example 2, the following naphthalenedicarboximide compounds are prepared.

N - ethyl - 1,4,5,8 - tetrahydro-4a,8a-naphthalenedicarboximide, having a molecular weight of 231.3, is prepared by mixing 1,4,5,8-tetrahydro-4a,8a-naphthalenedicarboxylic anhydride with excess aqueous ethylamine.

N - propyl - 1,4,5,8 - tetrahydro - 4a,8a - naphthalenedicarboximide, having a molecular weight of 245.3, is prepared by mixing 1,4,5,8-tetrahydro-4a,8a-naphthalenedicarboxylic anhydride with excess aqueous propylamine.

Example 4

In substantially the same procedure set out above in Example 1 employing similar solvents and employing the products of Example 3 as starting materials, the following naphthalenedicarboximide compounds are prepared.

N - ethyl - 4a,8a - naphthalenedicarboximide, having a molecular weight of 227.3, is prepared by mixing N-ethyl-1,4,5,8 - tetrahydro - 4a,8a - naphthalenedicarboximide with N-bromosuccinimide, mixing the resulting intermediate with quinoline and separating the product by chromatography.

N - propyl - 4a,8a - naphthalenedicarboximide, having a molecular weight of 241.2, is prepared by mixing N-propyl - 1,4,5,8 - tetrahydro-4a,8a-naphthalenedicarboximide with N-bromosuccinimide, mixing the resulting intermediate with quinoline and separating the product by chromatography.

Example 5

147 milligrams of the 4a,8a-naphthalenedicarboximide of Example 1 were dissolved in 10 milliliters of methanol. The resulting solution was mixed with an excess of a dilute solution of diazomethane in ether. The reaction mixture was filtered and the filtrate was evaporated in vacuo. The residue was recrystallized from carbon tetrachloride and the N-methyl-4a,8a-naphthalenedicarboximide product was found to melt at 151°–152° C. The structure of the product was confirmed by infrared spectroscopy.

Example 6

Ten grams of 3,6-dihydrophthalic anhydride, 25 milliliters of dioxane and 50 milliliters of isoprene were mixed together and the mixture was heated to 150° C. for 22 hours in a bomb. The mixture was cooled and poured into 250 milliliters of water. The resulting mixture was extracted with three portions of chloroform and the chloroform extracts were combined. The combined extracts were washed with two portions of water, dried over anhydrous sodium sulfate and evaporated in vacuo. The residue was mixed with 250 milliliters of aqueous 20 percent sodium hydroxide and the mixture was heated for about 30 minutes on a steam bath. The mixture was then cooled and extracted with two portions of chloroform, the chloroform extracts being discarded. The mixture was acidified by the addition of excess aqueous 10 percent sulfuric acid and a white solid precipitated. The mixture was filtered and the filter cake was dried and mixed with 100 milliliters of acetyl chloride. The resulting mixture was heated to the boiling point under reflux for about 45 minutes, evaporated in vacuo and the residue was mixed with 300 milliliters of water. The mixture was extracted with chloroform, the chloroform extract was washed with water, dried over anhydrous sodium sulfate and evaporated in vacuo. The residue crystallized on cooling and was recrystallized from carbon tetrachloride. The recrystallized solid was mixed with 50 milliliters or concentrated aqueous ammonia and the mixture was heated to the boiling point under reflux for about four hours, during which time a solid precipitate formed. The mixture was filtered and the 2-methyl-1,4,5,8-tetrahydro-4a,8a-naphthalenedicarboximide product was collected as a filter cake. The product was recrystallized from ethanol and was found to melt at 180°–182° C. and to have carbon, hydrogen and nitrogen contents of 71.98, 6.97 and 6.50 percent, respectively, as compared with the contents of 71.87, 6.96 and 6.45 percent, respectively, calculated for the named structure.

In substantially the same procedure, 1-methyl-1,4,5,8-tetrahydro - 4a,8a - naphthalenedicarboximide, having a melting point of 190°–193° C., was prepared by the reaction of 3,6-dihydrophthalic anhydride with excess piperylene, with the product of this reaction being then mixed with excess aqueous ammonia. The 1-methyl-1,4,5,8 - tetrahydro-4a,8a-naphthalenedicarboximide product was found by analysis to have carbon, hydrogen and nitrogen contents of 72.06, 7.05 and 6.35 percent, respectively, as compared with the contents of 71.87, 6.96 and 6.45 percent, respectively, calculated for the named structure.

In substantially the same procedure, 1-ethyl-1,4,5,8-tetrahydro-4a,8a-naphthalenedicarboximide, having a molecular weight of 231.3, is prepared by mixing together 3,6-dihydrophthalic anhydride and 1,3-hexadiene and thereafter mixing the resulting product with excess aqueous ammonia.

In substantially the same procedure, 2-propyl-1,4,5,8-tetrahydro-4a,8a-naphthalenedicarboximide, having a molecular weight of 245.3, is prepared by mixing together 3,6-dihydrophthalic anhydride and 2-propyl-1,3-butadiene and thereafter mixing the resulting product with excess aqueous ammonia.

Example 7

Groups of mice were administered one of the naphthalenedicarboximide compounds by intraperitoneal injection at various dosage rates. Thirty minutes following the administration of the test compound, the mice were administered Metrazol (pentamethylenetetrazole) by subcutaneous injection at a dosage rate of 85 milligrams per kilogram. The administration of 85 milligrams per kilogram of Metrazol to mice results in severe clonic convulsions followed by substantially 100 percent lethality within one hour. In representative operations, the dosage of 1,4,5,8 - tetrahydro - 4a,8a - naphthalenedicarboximide which was found to be effective in preventing convulsions and death in 50 percent of the mice treated ($ED_{50}$) was found to be 22 milligrams per kilogram. In other similar operations, the effective dose ($ED_{50}$) of 4a,8a-naphthalenedicarboximide for protection of mice against Metrazol-induced convulsions was found to be 45 milligrams per kilogram.

Example 8

In other operations, 1,4,5,8-tetrahydro-4a,8a-naphthalenedicarboximide was dispersed in sterile water to prepare an injectable composition. The composition was administered to groups of mice at various dosage rates by intraperitoneal injection. Thirty minutes following the administration of the named compound, the mice were administered strychnine by the intraperitoneal injection of 2 milligrams per kilogram of strychnine sulfate. The administration of 2 milligrams per kilogram of strychnine sulfate to untreated mice normally results in convulsions and death within thirty minutes. The dosage of 1,4,5,8-tetrahydro-4a,8a-naphthalenedicarboximide which was found to be effective in preventing strychnine-induced convulsions and death in 50 percent of the mice ($ED_{50}$) was found to be 86 milligrams per kilogram.

Example 9

In other operations, the dosage of 1,4,5,8-tetrahydro-4a,8a-naphthalenedicarboximide required to be lethal in 50 percent of the mice ($LD_{50}$) was found to be 620 milligrams per kilogram by intraperitoneal injection. In other operations, the compounds 4a,8a-naphthalenedicarboximide, N - methyl-4a,8a-naphthalenedicarboximide, 1,4,5,8-tetrahydro - 4a - 8a - naphthalenedicarboximide and N-methyl - 1,4,5,8-tetrahydro-4a-8a-naphthalenedicarboximide were found not to protect mice from convulsions induced by electroshock. Drugs which are known to be of value in alleviating convulsive states associated with certain central nervous system disorders are known to block the pharmacological effects of Metrazol while having little or no effect against convulsions induced by electroshock [Goodman et al., J. Pharmacol. Exp. Ther., 108, 428 (1953)].

Example 10

Two parts of sodium lauryl sulfate, 8 parts of talc and 8 parts of magnesium sulfate are mixed together. Twelve parts of corn starch are added to the mixture and mixed well. 250 parts of 4a,8a-naphthalenedicarboximide are thoroughly blended with the mixture. The mixture is then filled into No. 1 hard gelatin capsules in the amount of 0.28 gram of the mixture for each capsule. The resulting composition is suitable for oral administration to provide a dose of 250 milligrams of 4a,8a-naphthalenedicarboximide.

Example 11

A mixture of 250 parts of 1,4,5,8-tetrahydro-4a,8a-naphthalenedicarboximide and 7 parts of wheat starch are mixed with a paste composed of 6 parts of gelatin, 40 parts of wheat starch and 75 parts of water, and the mixture is granulated. The granulate is passed through an eight mesh screen and dried completely. The granulate is then passed through a twelve mesh screen and mixed with 3.5 parts of magnesium stearate and 13.5 parts of powdered talcum. The resulting composition is mixed well and compressed into tablets weighing 0.38 gram each.

Example 12

An intimate mixture of 400 parts of 1,4,5,8-tetrahydro-4a,8a-naphthalenedicarboximide, 94 parts of corn starch, 45 parts of alginic acid and 3.5 parts of magnesium stearate is compressed into slugs which are then broken into granules and passed through an eight mesh screen. The granules are then intimately mixed with 3.5 parts additional magnesium stearate. The mixture is compressed into tablets weighing 0.28 gram each.

We claim:

1. The method useful for combatting convulsions in animals comprising administering to an animal an anticonvulsant dose of a maphthalenedicarboximide compound corresponding to one of the formulae

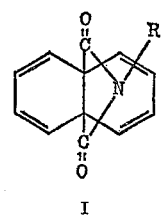

I

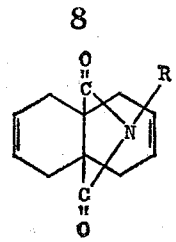

II or

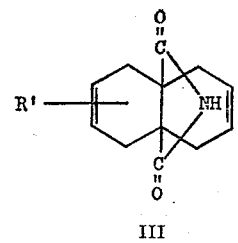
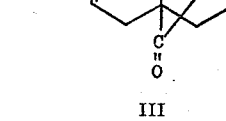

III wherein R represents a member of the group consisting of hydrogen and lower alkyl groups containing from 1 to 3 carbon atoms, inclusive, and R' represents a member of the group consisting of methyl, ethyl and propyl.

2. The method of claim 1 wherein the compound is 4a,8a-naphthalenedicarboximide.

3. The method of claim 1 wherein the compound is 1,4,5,8-tetrahydro-4a,8a-naphthalenedicarboximide.

4. The method of claim 1 wherein the compound is administered at a dosage rate between about 10 and about 95 milligrams per kilogram of animal body weight.

5. An anticonvulsant composition in dosage unit form comprising a pharmaceutical carrier having incorporated therein from about 100 to about 300 milligrams per unit of a naphthalenedicarboximide compound corresponding to the formula

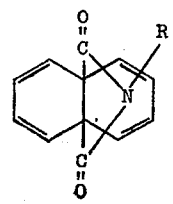

wherein R represents a member of the group consisting of hydrogen and lower alkyl groups containing from 1 to 3 carbon atoms, inclusive.

6. The composition of claim 5 wherein the compound is 4a,8a-naphthalenedicarboximide.

7. An anticonvulsant composition in dosage unit form comprising an inert solid pharmaceutical carrier having incorporated therein from about 100 to about 300 milligrams per unit of a naphthalenedicarboximide compound corresponding to the formula

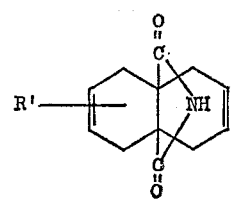

wherein R' represents a member of the group consisting of methyl, ethyl and propyl.

8. An anticonvulsant composition comprising a pharmaceutical carrier having incorporated therein from about 25 to about 95 percent of a naphthalenedicarboximide compound corresponding to the formula

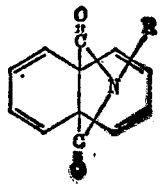

wherein R represents a member of the group consisting of hydrogen and lower alkyl groups containing from 1 to 3 carbon atoms, inclusive.

9. The composition of claim 8 wherein the compound is 4a,8a-naphthalenedicarboximide.

10. An anticonvulsant composition comprising an inert solid pharmaceutical carrier having incorporated therein from about 25 to about 95 percent of a naphthalenedicarboximide compound corresponding to the formula

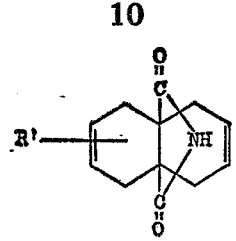

wherein R' represents a member of the group consisting of methyl, ethyl and propyl.

References Cited

Chem. Abstracts, vol. 63, Subject Index, J–Z, p. 2006S (1965).

ALBERT T. MEYERS, Primary Examiner

S. FRIEDMAN, Assistant Examiner

U.S. Cl. X.R.

260—326